Jan. 24, 1939.  E. E. FRANZ  2,144,840
APPARATUS FOR WINDING MATERIAL
Original Filed Feb. 9, 1935   2 Sheets-Sheet 2
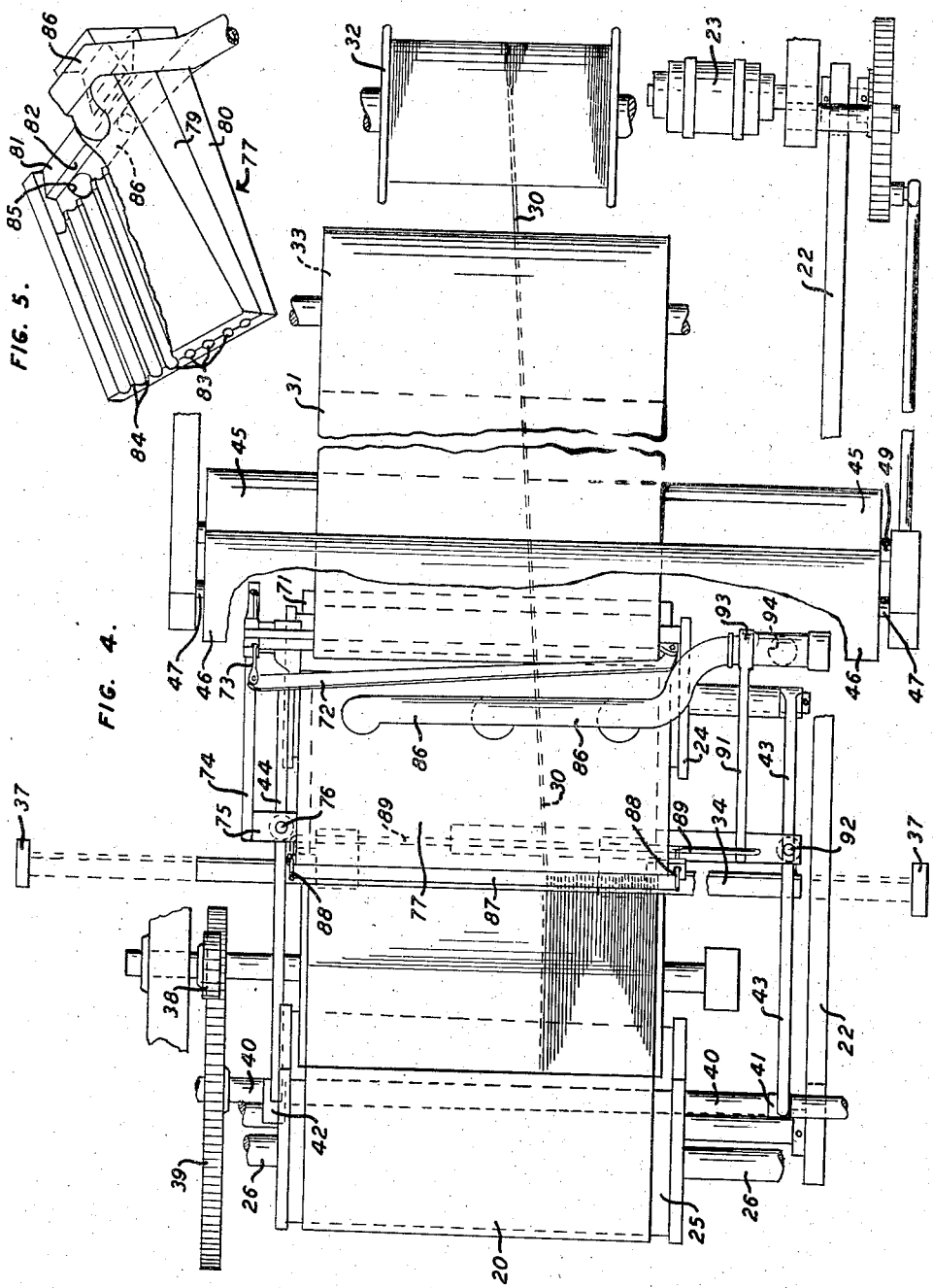
INVENTOR
E. E. FRANZ
BY
E.R. Nowlan
ATTORNEY Patented Jan. 24, 1939

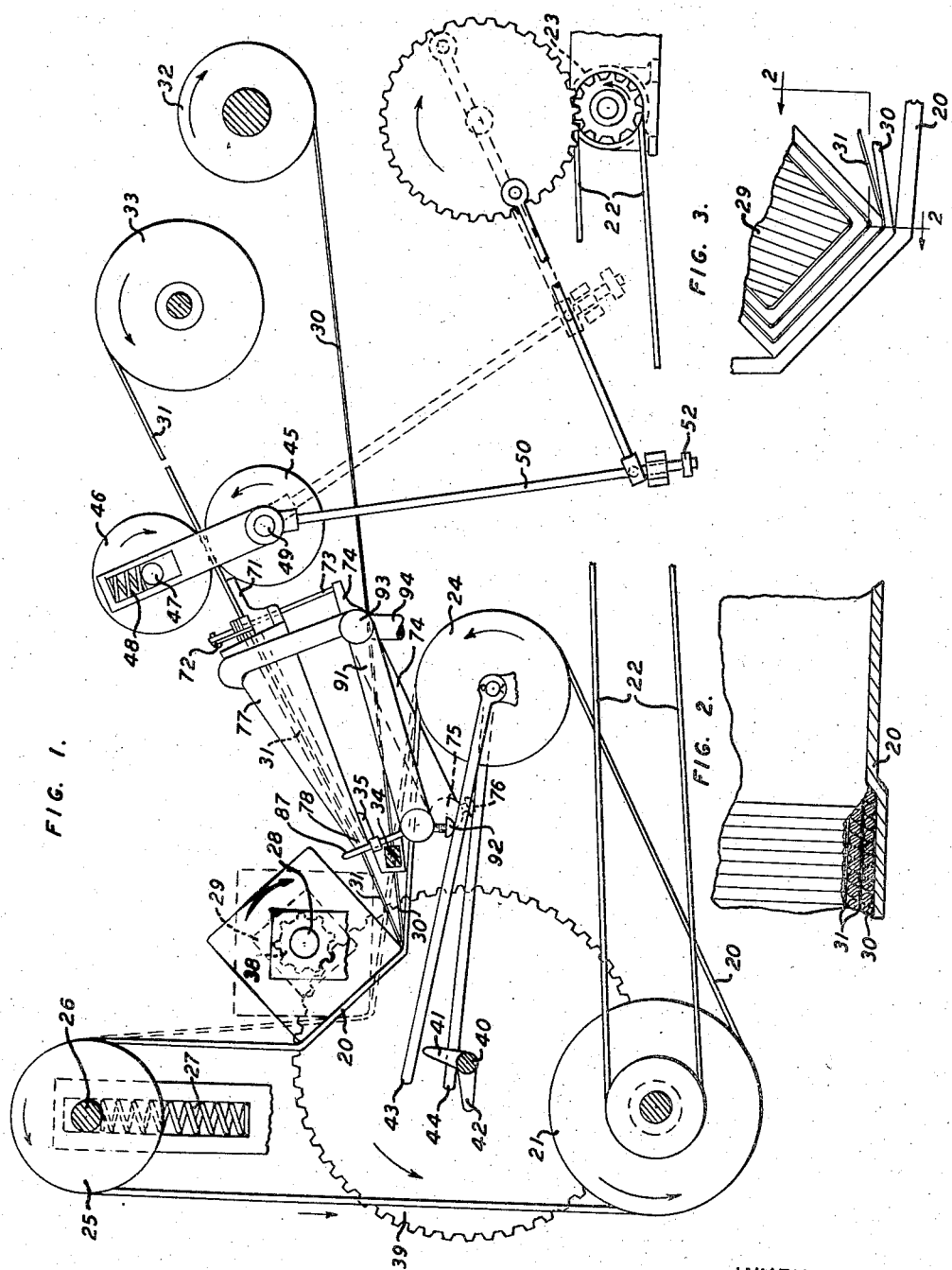

2,144,840

UNITED STATES PATENT OFFICE 2,144,840

APPARATUS FOR WINDING MATERIAL

Erwin E. Franz, Cranford, N. J., assignor to Western Electric Company, Incorporated, New York, N. Y., a corporation of New York Original application February 9, 1935, Serial No. 5,743. Divided and this application December 11, 1935, Serial No. 53,959

4 Claims. (Cl. 271—8)

This invention relates to an apparatus for winding material and more particularly to an apparatus for applying strand material and sheet material upon an article or core at one operation in alternate layers.

This application is a division of application Serial Number 5,743, filed by the same inventor under date of February 9, 1935. Patentable subject matter disclosed but not claimed in this application is claimed in one of the following applications filed on the same date herewith, Serial Number 53,957, Serial Number 53,958, or Serial Number 53,960.

In the art pertaining to electrical coils, there is a class or variety of coil having a core of either solid or axially hollow form and of either magnetic or non-magnetic material in which an insulated electrically conductive strand is wound in concentric layers back and forth over the peripheral surface of the core, which peripheral surface may be cylindrical in some instances or prismatic in others. In such coils it may be desirable to place further insulation between consecutive helically wound layers of the conductive strand, in the form of sheets of paper or other insulating substance, and ordinarily each such sheet is so dimensioned and applied that its extremities overlap each other to form a completely closed cylindrical or prismatic surface between two complete layers of conductor.

An object of the present invention is to provide a simple and effectively operating apparatus which may be applied to the manufacture of articles having layers of strand.

One embodiment of the invention contemplates substantially automatically operating apparatus provided with means to hold an article such as a coil core, means to hold a supply of sheet material and of strand material, and means to apply the sheet material and the strand to the core or other article in alternate layers, the strand being applied by a continuous winding operation and the sheet being cut to appropriate lengths and applied intermittently by a pneumatic device over each completed layer of strand, together with means to distribute the strand and means to modify the length of successive sheets of material to be intercalated between strand layers to conform to the changing peripheral size.

Other objects and features of the invention will appear from the following detailed description of one embodiment thereof taken in connection with the accompanying drawings in which like reference numerals are applied to identical parts in the several figures and in which Fig. 1 is a broken schematic view in side elevation of a machine constructed in accordance with the invention and adapted to wind insulated wire and paper sheets in alternating layers upon a prismatic core;

Fig. 2 is an enlarged broken detail view in section on the line 2—2 of Fig. 3;

Fig. 3 is an enlarged broken detail view in transverse section of a portion of a core being wound in the machine;

Fig. 4 is a broken schematic view in plan corresponding to Fig. 1; and

Fig. 5 is an enlarged detached perspective view of one of the air blast housing sections.

In the embodiment herein disclosed, a core driving belt 20 runs over a driving drum 21 rotatably mounted in fixed position and driven by a belt 22 from a motor 23. The belt 20 runs also over a fixedly positioned idler drum 24 and over a tensioning drum 25 whose shaft 26 is supported on and urged upwardly by resilient means such as a compression spring 27.

A shaft or spindle 28 is mounted as shown to lie parallel to the surface of the belt and is adapted to receive and support a coil core 29 for winding insulated wire 30 and paper sheet insulation 31 thereon, the wire being drawn as required from a supply reel 32 and the paper from a supply drum 33 each appropriately supported and mounted in the relative positions shown. The drum 33 and reel 32 will be provided with customary means (not shown) to afford tension on the material being drawn therefrom.

The belt 20 runs against the under face of the core 30 or of the wire and/or paper wound thereon and thus drives the core and therewith the shaft 28 in rotation. A distribution control rod 34 oriented parallel to the shaft 28 is mounted to slide freely longitudinally in a pair of supports 35 supported in any suitable fashion, and the rod is provided substantially midway of its length with a transverse perforation 36 which fits loosely about the strand 30 threaded therethrough. Stops 37 are rigidly positioned in line with the ends of the rod and are so spaced that when a complete layer of strand is laid on the core the rod carried along by the strand will bump against one or other of the stops and by its slight rebound therefrom will start the strand to coil in a reverse direction, the distribution of the strand in snugly abutting turns during the winding being generally effected as indicated in Fig. 2 by the yielding pressure of the belt 20 in both lateral and radial directions against the portion of strand momentarily being wound.

The shaft 28 carries at its farther end a gear 38 meshing with another gear 39 mounted on a shaft 40 below and parallel to the shaft 28. Cams 41 and 42 are mounted on the near and far portions respectively of the shaft 40. Cam 41 actuates a lever 43 pivoted on any convenient support such as the shaft of the idler drum 24. Cam 42 actuates a similar lever 44 similarly pivotally mounted.

A continuous sheet of paper 31 or other analogous material, is drawn from the storage or supply roller 33 and passes over an intermittently actuated measuring roller 45 and under a complementary freely rotatable roller 46 mounted on a shaft 47 and urged toward the roller 46 by gravity or, as shown, by springs 49. Two parallel actuating levers 50 and 51 are secured rigidly at one end to a collar 63 surrounding the shaft 49 in which latter the roller 45 is rigidly mounted. The other ends of the levers are held spaced apart in a yoke 52.

The levers 50 and 51 are driven to and fro and turn the roller 45 in step by step unidirectional motion of varying amplitude by means not herein further described as not pertinent to the subject matter of the present invention, but which are completely disclosed and described in the above identified application of which the present is a division.

The sheet of paper 31 emerging from between the rollers 45 and 46 passes over a narrow supporting table 71 the left hand edge of which forms the fixed blade of a shearing device of which the movable member 72 is the other blade. The near end of the blade 72 is pivoted to the table, and a link 73 is pivotally attached at one end thereof to one arm of a lever 74 the other end of which is provided with an offset stud 75 carrying in which is mounted an adjustment screw 76 the head of which rests on the lever 44 to be lifted thereby.

The paper 31 after passing the shears 71, 72 is received within an air blast housing 77 whose base faces the shears and whose nose 78 points toward the point of application of the strand 30 to the winding on the core 29. This housing consists of two substantially identical complementary sections 79 and 80 and a description of either will apply equally to both. Thus the section 80 (Fig. 5) may be a solid block of metal formed on the surface which is applied to the section 79 with a transverse rearwardly sloping entrance ramp 81 leading to a comparatively large recess 82 from the forward side of which a plurality of relatively wide parallel air grooves 83 separated by narrow paper guides 84 extend through the nose portion. One or more passages 85 communicate from the recess 82 to an air duct 86 encircling the whole housing. The paper guides 84 may preferably be slightly beveled at their upper or rear ends to facilitate the passage of the paper thereover, there being a narrow space between the guides 84 of the block 80 and the correspondingly positioned guides of the superimposed block 79. A movable gate normally closes the outlet of the nose 78 and comprises a flat bar 87 carried at either end on pins 88 upstanding from a transverse rod 89 resting on a transverse member 90 carried by a lever arm 91 and extending beyond the same to support an adjustment screw 92 whose head rests on the lever 43.

The lever 91 is pivoted by an integral collar 93 on the inlet of the air duct 86 and there actuates a valve (not shown) within the collar which controls the admission of compressed air from a source not shown through a pipe 94 to the air duct 86.

In operation a roll of strand is placed at 32, a roll of paper at 33 and a core 29 to be wound is placed on the spindle 28. The strand 30 is brought through the hole in the rod 34 and secured to the core at one end of the lateral peripheral surface thereof. The paper is brought between the rollers 45 and 46 and over the table 71 until its previously squared end matches against the shear blade edge of the table. The various driving gears and other interrelated parts and mechanisms are so proportioned and arranged that the sequence or cycle of operations and events now to be described will ensue in proper order and relation.

The motor 23 is then started, driving the drum 21 and with it the belt 20, which, running against the under side of the core 29 and against the strand 30 thereon, rotates the core to wind the strand thereon and simultaneously forces each turn of the winding to lie snugly and smoothly against the previous turn as indicated in Fig. 2. The core contemplated in the present disclosure is one in the form of a spool having a central drum of substantially square cross-section and enlarged parallel transverse heads. Hence the radius of the part of the core against the belt varies, and therefore the drum 25 is yieldingly mounted to allow the belt to accommodate itself to the core in all positions. When one layer of winding is completed the head of the core compels the first turn of the next layer to lie upon the last turn of the preceding layer and the rod 36 bumping against one of the stops 37 and rebounding slightly brings the second turn out beside the first thus starting the winding of the second layer in the opposite direction to the first.

The gear 38, driven by the core on the spindle 28, drives the gear 39 and hence the cams 41 and 42. A sheet of paper of suitable length, prepared as hereinafter described, is at this time lying in the housing 77 against the gate 87. At the moment when the last turn of a winding is completed, the cam 41 lifts the lever 43, the screw 92 and the lever 91 opening the air valve within the collar 93. Compressed air from the duct 94 enters the housing both above and below the sheet of paper through the duct 86, chamber 82 and grooves 83. The sheet is blown forward until its forward edge is caught by the incipient first turn of the next layer of winding and is rolled around the preceding layer of winding by the belt 20 and is covered by the succeeding layer, the sheet being of such length as to wrap once around with a slight overlap. The lever 91 in rising carries the bar 90 with it forcing the pins 88 and the paper stop 87 up to allow the paper to be blown out of the housing 77. The cam 41 immediately drops the lever 91, cutting off the supply of air and bringing the paper stop 87 back over the outlet of the housing.

Evidently each layer of the winding is of greater circumference than the preceding layer and requires a longer sheet of paper to wrap around it. The length of each sheet is determined by the action of the paper feed roller 45 which is driven step by step by the levers 50 and 51.

When the predetermined length of paper has been fed through the shears, the cam 42 lifts the lever 44 pulling the shear blade 72 down to cut the paper off, and the latter slides down by gravity between the guides 84 and rests against the gate 87 ready for another cycle of operation as described.

Thus the apparatus winds strand on a core in successive helically wound layers as a continuous operation, and at the same time measures out, cuts off, and inserts pieces of sheet material, of predetermined and predeterminedly changing lengths, between consecutive layers of strand winding.

The accompanying drawings are purely schematic, many details not essentially of the invention being omitted as familiar to those skilled in the art, and the proportions of parts being distorted in some instances for clearness or compactness. In particular the ratio of the gears 38:39 will be dependent upon the number of turns in each layer of the winding.

It may be pointed out here that an important advantage of the present invention is that the pneumatic means therein provided for placing the sheet material on the article, by proper timing of the action thereof, permits the placing of the sheets in position to be caught and wound by the strand without any necessity of halting or even slowing down the strand winding mechanism, as is required in some machines of the prior art having mechanical devices for this purpose. Such deceleration and acceleration either makes it necessary to run the machine at a slow average pace or else may be the cause of racking the apparatus destructively, at least so far as its accuracy of operation and particularly of operative synchronism of functioning is concerned.

Another important feature is the orientation of the grooves 83 in the housing 77 along the direction of motion of the sheets and of the flow of air. While each sheet is guided between the ridges 84 and propelled both by action of the air on its faces and possibly on its rear edge, vibration of the rear edge analogous to that of a musical reed is prevented by the relief of incipient air pressure above or below, or its equalization, via the channels 83.

Another notable advantage is the simplicity of the means used to place the strand in snugly abutted coils in each layer of winding and to reverse the winding spiral in successive layers. There is no complex and delicate distributor mechanism to be driven in swiftly alternated reciprocation. The belt 20, which serves to drive the core in rotation, is made of laterally flexible and even laterally slightly elastically extensible construction, and in virtue of these qualities the belt serves also to guide and seat the wire properly as it is wound on. A belt for this purpose may be made of woven fabric with a rubber or similar covering thereover, the strands of the fabric running longitudinally of the belt being closely juxtaposed and the transverse strands being relatively widely spaced and loosely interwoven. It will be noted that the double function of the belt is to press the strand being wound both laterally and radially of the rotating article being wound against both the article and the previous turn of strand, and that this pressure is effected at the point of application of the strand to the article. The belt is effective for its purposes whether sheet material is being intercalated between layers of strand or not, and is therefore not limited in use to winding both types of material simultaneously.

The embodiment herein disclosed is illustrative only and may be widely modified and departed from without departing from the spirit and scope of the invention as pointed out in and limited solely by the appended claims.

What is claimed is:

1. In an apparatus for winding sheet material on an article, means to feed disconnected portions of sheet material thereto comprising a housing to receive a portion of sheet material and having an interior space defined by the housing and consisting of a tapered sheet receiving portion and an enlarged air receiving portion communicating therewith and a contracted sheet guiding portion opening therefrom, and pneumatic means to blow the portion edgewise out of the housing, all the walls of the said housing being impervious except for entrance and exit apertures for the sheet material and the pneumatic fluid.

2. In an apparatus for winding sheet material on an article, means to feed disconnected portions of sheet material thereto comprising a housing to receive a portion of sheet material and having an interior space defined by the housing and consisting of a tapered sheet receiving portion and an enlarged air receiving portion communicating therewith and a contracted sheet guiding portion opening therefrom, a movable gate, and pneumatic means to blow the portion edgewise out of the housing, all the walls of the said housing being impervious except for entrance and exit apertures for the sheet material and the pneumatic fluid.

3. In an apparatus for winding sheet material on an article, means to feed disconnected portions of sheet material thereto comprising a housing to receive a portion of sheet material, all the walls of the housing being impervious except for entrance and exit apertures for the sheet material and for pneumatic fluid, a movable gate to close the exit aperture, and means to supply fluid under pressure to the pneumatic fluid entrance aperture to blow a portion of sheet material edgewise from the exit aperture.

4. In an apparatus for winding sheet material on an article, means to feed disconnected portions of sheet material thereto comprising a housing to receive a portion of sheet material, all the walls of the housing being impervious except for entrance and exit apertures for the sheet material and for pneumatic fluid, a movable gate to close the exit aperture, means to supply fluid under pressure to the pneumatic fluid entrance aperture to blow a portion of sheet material edgewise from the exit aperture, and means to open the gate and to actuate the fluid supply means in timed relation.

ERWIN E. FRANZ.